Dec. 21, 1926.

J. HEBERLING

BELT BUCKLE

Filed Feb. 13, 1924

1,611,192

INVENTOR.
John Heberling
BY Davis Simms
HIS ATTORNEYS.

Patented Dec. 21, 1926.

1,611,192

UNITED STATES PATENT OFFICE.

JOHN HEBERLING, OF ROCHESTER, NEW YORK.

BELT BUCKLE.

Application filed February 13, 1924. Serial No. 692,589.

The present invention relates to belt buckles and more particularly to the type in which there is provided a buckle frame with a clamping member mounted to swing about a suitable axis on the frame toward and from the clamping surface, an object of this invention being to provide a construction in which the clamping portion of the clamping member may be held at different distances from the axis of turning of the clamping member so that belts of different thicknesses may be clamped by the belt buckle. A further object of the invention is to provide a buckle in which the clamping portion is movable with reference to the axis of turning of the clamping member and means is provided for defining the position of the clamping portion with reference to the axis of turning of the clamping member so that belts of different thicknesses may be clamped by the buckle.

To these and other ends, the invention consists of certain parts and combinations of parts, all of which will be hereinafter described; the novel features being pointed out in the appended claims.

Figure 1:
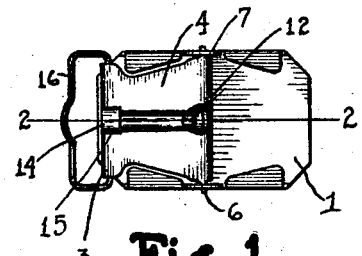
Fig. 1 is a rear view of a buckle constructed in accordance with this invention.
Figure 2:
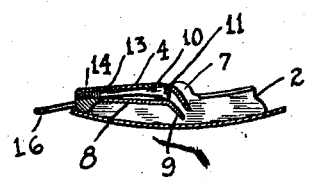
Fig. 2 is a longitudinal section through the buckle showing the clamping portion adjusted to one position.
Figure 3:
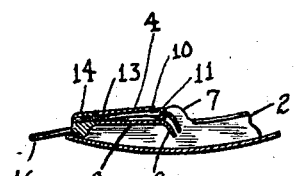
Fig. 3 is a view similar to Fig. 2, showing the clamping portion adjustable to another position.
Figure 4:
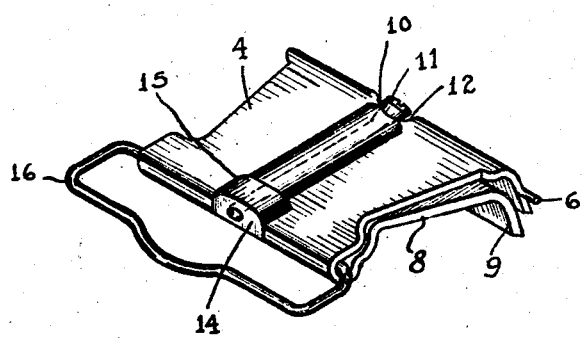
Fig. 4 is an enlarged perspective view of the clamping member.

Referring more particularly to the drawings, 1 indicates the front plate of a buckle, the rear surface of which forms a clamping surface. Side flanges 2 are provided and on these side flanges the clamping member is pivotally supported. In this instance, this clamping member is formed from a single piece of sheet material bent between its ends at 3 to provide two arms 4 and 8. One of these arms has pintles 6 extending therefrom and mounted to turn in openings in lugs 7 formed on the side flanges. The other arm 8 of the clamping member has an inwardly bent portion 9 which forms the clamping portion of the clamping member and cooperates with the rear face of the front plate 1 to clamp the belt. The material is made of spring stock and the resilient bend 3 is such that the portion 8 tends to lie toward the portion 4.

In order to effect the movement of the clamping portion 9 with reference to the supporting portion 4 and also with reference to the axis of turning of the clamping member, a tapered member 10 is provided which lies between the two arms 4 and 8 and has a head 11 formed with a slot and exposed through an opening 12 in the member 4. This tapered member has also a screw threaded portion 13 which operates in a nut 14 received in a recess 15 at the junction of the two members 4 and 8, said nut having its opposite sides flattened to cooperate with the opposite sides of the recess in order to keep the nut from turning. It is apparent that the turning of the tapered screw 10 through a screw driver or other means will separate the members 4 and 8 or permit them to move toward each other, and as a consequence the clamping portion 9 will move toward and from the axis of turning of the clamping member and in this way accommodate belts of different thicknesses between the clamping portion 9 and the rear surface of the front plate 1. A loop 16 is mounted to turn on the swinging clamping member, being held at the bend between the two arms of such clamping member.

From the foregoing it will be seen that there has been provided a buckle in which there is employed a clamping member mounted to swing about a suitable axis and having a clamping portion adjustable so as to be held in different positions with reference to said axis of turning so that belts of different thicknesses may be accommodated. This clamping member is formed by two arms one of which is pivoted to the buckle frame, while the other of which is mounted to move on said first mentioned arm about a point away from the axis so that the clamping portion on said second mentioned arm may move relatively to the axis, provision being made for effecting the adjustment of the two arms relatively to each other. This adjusting means comprises, in this instance, a tapered member or screw operating between the two arms to spread them apart, the resilient connection between the two arms tending to move the arm carrying the clamping portion toward the arm which is pivotally mounted on the buckle frame.

What I claim as my invention and desire to secure by Letters Patent is:

1. A belt buckle comprising a buckle frame having a clamping surface, a clamping member pivotally mounted on said frame, having a clamping portion movable toward and from the clamping surface of said buckle, and adjustable means for shifting the clamping portion relatively to the axis of turning of the clamping member so as to accommodate belts of different thicknesses in the buckle, said means holding the clamping portion in its adjusted position relatively to the axis of turning of the clamping member.

2. A belt buckle comprising a buckle frame having a clamping surface, a clamping member having two relatively movable arms one of which is pivotally supported and the other of which carries a clamping portion for cooperating with the clamping surface of the buckle frame, and adjustable means for effecting the movement of the last mentioned arm with reference to the first mentioned arm and for holding the last mentioned arm in its adjusted position with reference to the first mentioned arm.

3. A buckle comprising a buckle frame having a clamping surface, a clamping member comprising two arms one of which is pivotally mounted on the buckle frame and the other of which is resiliently connected to the first mentioned arm, and an adjustable wedge operating between the two arms to move the arm carrying the clamping portion relatively to the arm that is pivotally mounted, said wedge being constructed and arranged to hold the arm carrying the clamping portion in its adjusted position relatively to the pivotally mounted arm.

4. A buckle comprising a buckle frame having a clamping surface, a clamping member having two arms, one of which is pivotally mounted on the buckle frame and the other of which has a clamping portion, the two arms being resiliently connected, a nut held against turning on the clamping member, and a wedge screw cooperating with the nut and operating between the two arms to effect relative movement between them.

5. A buckle comprising a buckle frame having a clamping surface, a clamping member pivotally mounted on the buckle frame and formed from one piece of material and having two arms connected by a resilient bend, a nut carried by said clamping member, and a tapered screw cooperating with said nut and operating between the two arms to effect the relative movement between such arms.

JOHN HEBERLING.